(No Model.)
D. WEIR.
DRILL CHUCK.
No. 549,837. Patented Nov. 12, 1895.
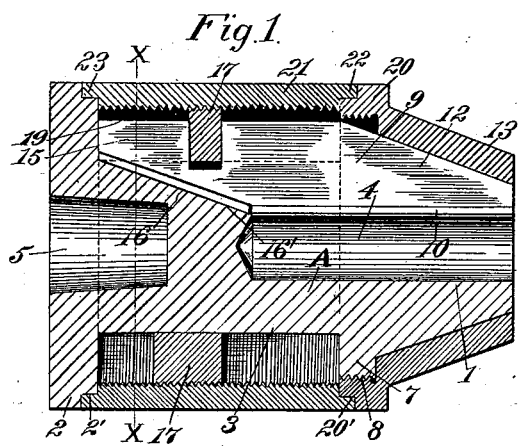
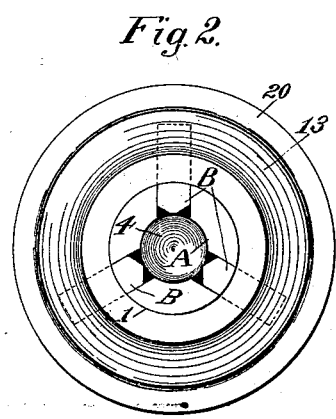
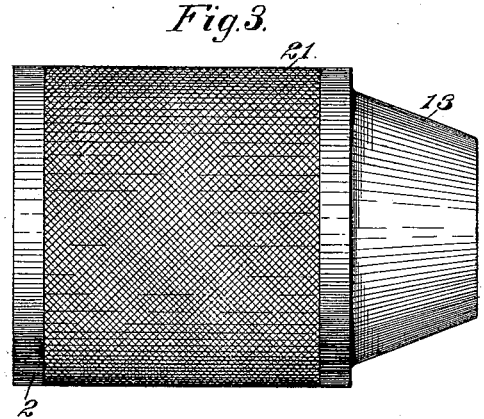
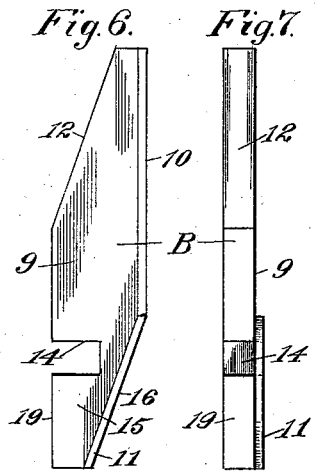
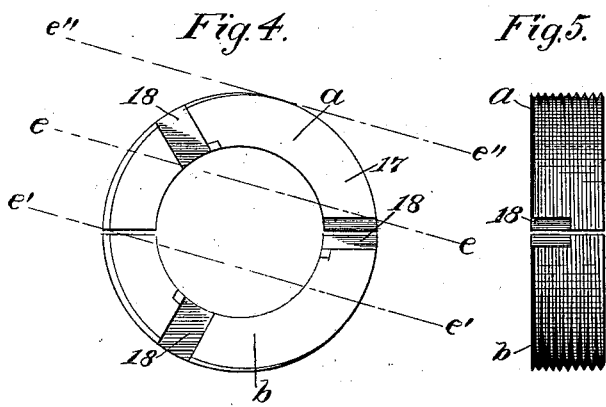
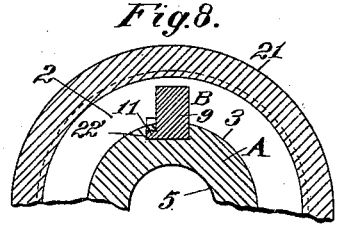
Witnesses:
R. W. Pittman
Fred. J. Dole.
Inventor:
David Weir
By his Attorney
F. H. Richards.

UNITED STATES PATENT OFFICE.

DAVID WEIR, OF HARTFORD, CONNECTICUT.

DRILL-CHUCK.

SPECIFICATION forming part of Letters Patent No. 549,837, dated November 12, 1895.

Application filed July 5, 1895. Serial No. 554,939. (No model.)

*To all whom it may concern:*

Be it known that I, DAVID WEIR, of the city and county of Hartford and State of Connecticut, have invented certain new and useful Improvements in Drill-Chucks, which improvements are described in the following specification and are illustrated by the accompanying drawings.

This invention relates to drill-chucks; and the object of the invention is to provide an improved drill-chuck adapted to securely and truly hold a tool or article, and which chuck will be simple in construction and operation and the parts of which can be quickly and easily assembled.

A further object of my invention is to provide a chuck in which the jaws thereof can be quickly and easily manipulated and positively guided in their movements and by means of which a powerful clamping action can be obtained.

In the accompanying drawings, forming part of this specification, Figure 1 is a longitudinal axial sectional view of my improved chuck. Fig. 2 is a right-hand end view thereof, showing parts thereof in dotted lines. Fig. 3 is a side elevation of the chuck complete. Fig. 4 is a rear face view of the operating-ring. Fig. 5 is a side view thereof. Fig. 6 is a side view of one of the clamping-jaws. Fig. 7 is a top view thereof; and Fig. 8 is a cross-sectional view of the upper portion of the chuck, taken in line $x$ $x$, Fig. 1, and showing a portion of the jaws in position thereon.

Similar characters represent like parts in all the figures of the drawings.

This improved drill-chuck comprises in the preferred form thereof herein shown and described a suitable body (designated in a general way by A) adapted for attachment to a spindle or mandrel of a lathe or other device, and embodies a body portion 3, having a cone-shaped head 1 and a bore 4, of any desired depth, adapted to receive the tool or article to be held by the chuck. The cone-shaped head 1 adjacent to its juncture with the body portion 3 has an annular flange 7, preferably of larger diameter than the body portion 3, and is provided on its circumferential face with screw-threads 8 for the attachment of the conical shell, hereinafter described.

Secured adjacent to the rear part of the body portion 3 is a second annular flange 2, likewise of larger diameter than said body portion 3, having a bore 5 extending therethrough and into said body portion 3, of any desired depth, whereby the chuck can be attached to a spindle or mandrel. The peripheral face of this flange 2 has a preferably right-angled recess or groove 2' adjacent to its inner face, for the purpose hereinafter set forth.

The chuck-body A is provided with a series of suitable radial grooves or recesses extending preferably from end to end of the same and from the outer face thereof to and opening into the bore 4 the entire depth thereof, and also adapted to form an inclined seat 16' in the body portion 3 in the rear of the bore 4 for the clamping-jaws. Any desired number of grooves or recesses may be provided; but in the preferred form of chuck herein shown three recesses or grooves are provided, corresponding with the number of clamping-jaws.

The clamping-jaws (designated in a general way by B) in the preferred form thereof herein shown and described are provided with horizontal upper and lower faces 10 and 19, united by inclined or beveled faces 12 and 16, and comprise a main part 9 and a shank 15, whereby the forwardly-inclined face 12 will be engaged by the interior wall of the conical shell, hereinafter described, and the rearwardly-inclined face 16 will rest and slide on the inclined seat 16', formed in the body portion 3 of the chuck. The shank portion of each of these jaws B is provided with a perpendicular recess 14 in the upper horizontal edge 19 thereof, and preferably formed adjacent to but in the rear of the juncture of the rearwardly-inclined lower face 16 with the horizontal lower face 10. As a means of guiding these jaws on the inclined seats 16' of the body portion 3 and also as a means of reinforcing said shank 15 at that part thereof where the recesses 14 are formed the under rearwardly-inclined side 16 of each of the jaws is provided with a laterally-extending reinforcing-rib 11, extending from the rear end thereof to and beneath the recesses 14, whereby the jaw is reinforced and whereby the recesses 14 can be made deeper and the jaws made of less depth, thereby reducing the size of a chuck for holding a given size of drill and insuring a greater strength and durability of the parts. As a means for rigidly and positively guiding these jaws B in their sliding movements, and thereby preventing the displacement thereof, the body portion 3 is provided in one of the side walls adjacent to each inclined seat 16' with a laterally-extending inclined recess or groove 22', with which the laterally-extending or reinforcing rib 11 engages.

In order to clamp the jaws B upon the tool or article, a conical shell 13, adapted to fit the cone-shaped head 1, is provided, and has adjacent to its interior rear portion screw-threads adapted to engage the exterior screw-threads 8 of the annular flange 7 of said head. This conical shell also has an annular flange 20 adjacent to its rear end, provided with a right-angled recess 20' on its inner side, in alignment with the right-angled recess 2' of the annular flange 2 at the rear of the body portion 3, for the purpose hereinafter set forth. By means of this conical shell the jaws B, when pressed forward by the means hereinafter described, are forced inwardly toward the axis of the chuck, and the under edges thereof, which are preferably beveled for this purpose, firmly clamp the tool or article inserted in the bore of the chuck. The preferred means for actuating these jaws consists of a non-rotatable divided member or ring 17, having any desired number of suitable notches or recesses 18 in one of its side faces, corresponding with the number of clamping-jaws and herein shown as three in number, and into each of which recesses one of the walls of each recess 14 of the jaws is adapted to project, whereby the member or ring 17 is kept from rotation. This member or ring 17 is shown divided through one of the recesses or notches 18 at one side thereof and on a line between two recesses or notches 18 at the other side thereof, forming thereby two semicircular members $a$ and $b$, whereby two clamping-jaws B will bear against each semicircular member and the force thereof be equally distributed—that is to say, each recess 18 of the ring or member 17 is engaged by one clamping-jaw, so that each half of the divided recess 18 is in engagement with one of the clamping-jaws, whereby the force of two clamping-jaws bearing against one half of the divided ring or against each member $a$ and $b$ is equally distributed on each side of the line $e$ $e$, which line $e$ $e$ represents the normal axis of the ring-segment $a$, the bearing-surface on one side of the said axis extending to the line $e'$ $e'$ and on the other side thereof to the line $e''$ $e''$, whereby the lines $e'$ $e'$ and $e''$ $e''$ are approximately equally distant from said axis, so that the leverage at any one point, tending to tip or turn the segment $a$ on said axis, is substantially the same on one side of said axis as on the other side thereof. It results from this that the pressures are so disposed that they do not tend to tip the ring-segment in its bearing within the sleeve nor otherwise tend to cramp the same or prevent the perfect action thereof, and this notwithstanding the division of the ring into segments. By this particular construction an equalized pressure of the jaws on the ring or member 17 is produced, so as to make the ring bear normally against the threads within the actuating-sleeve, hereinafter described, whereby the ring is supported against the pressure of the jaws. By this means the forces are also so distributed that the wear is evenly and properly distributed over the surface of the screw-threads on the outer side of the ring.

The means for actuating the ring or member 17, and thereby the clamping-jaws B, preferably consists of an actuating-sleeve 21, having screw-threads on its interior wall, adapted to engage with the screw-threads of the member or ring 17, and also having adjacent to its forward and rear ends right-angled annular recesses 22 and 23, adapted to engage the right-angled recesses 2' and 20', whereby the sleeve 21 is guided in its rotation and whereby on the rotation of the sleeve 21 the ring 17 is moved forward or backward, as required, and the clamping-jaws correspondingly moved to engage or release the tool or article inserted in the bore 4 of the chuck.

In assembling the parts of the chuck the jaws B are inserted into the recesses or grooves in the body A and the divided member or ring 17 placed in position engaging the recesses 14 of the clamping-jaws. The actuating-sleeve 21 is then screwed onto the threads of the divided member or ring, and the conical shell 13 then screwed onto the threaded cone-shaped head, and the chuck is ready for use in substantially the preferred form shown in Fig. 3.

In my improved chuck the parts thereof are not liable to get out of order, and the chuck is simple both as to the construction and operation, and the clamping-jaws can be moved simultaneously and uniformly and be guided positively against displacement and lateral movement and also be made much smaller than is now ordinarily the case and at the same time much stronger.

Having thus described my invention, what I claim is—

1. In a chuck, the combination with a body having a bore for the reception of a tool or article, and also having radial recesses opening into said bore; of clamping-jaws comprising a main clamping part and a shank, and each of said jaws having a recess in the upper edge and adjacent to the juncture of said main clamping part and the shank; a divided non-rotatable actuating member having a screw-threaded periphery, and adapted to engage the recesses in the jaws, and also having recesses on one of its side faces adapted to be engaged by the clamping-jaws; and means for actuating said actuating member and thereby the jaws, substantially as described.

2. In a chuck, the combination with the body having a bore therein for the reception of the tool or article, and having radial recesses opening into said bore and forming inclined seats, and also having laterally-extending grooves opening into said recesses; clamping-jaws movable in said recesses, each of said jaws comprising a main clamping part and a shank having an inclined lower edge, a reinforcing rib extending laterally from the lower edge of each jaw, and adapted to engage in one of the laterally-extending grooves, and each of said clamping-jaws also having a perpendicular recess in the top edge of the shank, and adjacent to the juncture of said shank and main clamping part; a divided, non-rotatable ring adapted to engage said recesses of the jaws, and having recesses on one of its side faces adapted to be engaged by said jaws; and means for actuating said ring, and thereby the jaws, substantially as described.

3. In a chuck, the combination with a body having a bore for the reception of the tool or article, and also having radial recesses opening into said bore and forming inclined seats in the rear of said bore, and also having laterally-extending inclined grooves in the sides of said recesses; clamping-jaws movable in said radial recesses and having inclined lower edges adapted to engage said inclined seats, and also having laterally-extending reinforcing ribs engaging in said laterally-extending grooves, each of said jaws also having a recess in its upper edge remotely disposed from the ends thereof and above said reinforcing rib; a non-rotatable member adapted to engage the recesses of the clamping-jaws and also having recesses in one of its side faces adapted to be engaged by the clamping-jaws; and means for actuating said member and thereby the jaws, substantially as described.

4. In a chuck, the combination with a body having a bore for the reception of the tool or article, and also having radial recesses opening into said bore; clamping-jaws movable in said recesses, and having recesses adjacent to their upper edges; a divided, non-rotatable actuating ring engaging the recesses of the clamping-jaws, and comprising two substantially semi-circular members, said actuating-ring having radial notches in one of its side faces and screw-threads on its peripheral face, and said ring being divided on a line through one of said notches and between the other notches, and each of said notches being engaged by a clamping-jaw, whereby a portion of each member of the actuating-ring adjacent to the divided notch will be in engagement with one of the clamping-jaws, so that each member is engaged by two clamping-jaws, and the pressure of said jaws on the ring equalized and the actuating member prevented from having a tipping action; and a rotatable sleeve having internal screw-threads engaging the screw-threads on the exterior face of the actuating member, whereby on the rotation of said sleeve said clamping-jaws will be actuated, substantially as described.

5. In a chuck, the combination with a body having a bore for the reception of the tool or article, and embodying a cone-shaped head having screw-threads adjacent to the rear part thereof, said body having radial recesses extending substantially from end to end thereof, and from the outer face of said body to, and opening into, the bore thereof, and forming inclined seats in the rear of said bore, and also having laterally-extending grooves in the sides of the recesses in the rear of said bore; clamping-jaws movable in said recesses, and each of said jaws having a main clamping part and a shank having an inclined lower edge provided with a laterally-extending reinforcing rib adapted to engage one of the laterally-extending grooves, and also having a perpendicular recess in its upper edge and adjacent to the juncture of said shank and main part; a divided, non-rotatable, exteriorly screw-threaded member adapted to engage the vertical recesses of the jaws, and having recesses in one of its side faces adapted to be engaged by the clamping-jaws; an exteriorly screw-threaded actuating-sleeve in engagement with said screw-threaded member; and a conical shell engaging the cone-shaped head, and having interior screw-threads in engagement with the screw-threads of the cone-shaped head, substantially as described.

6. In a chuck, the combination with a body having a bore for the reception of the tool or article, and embodying a body portion having an annular flange adjacent to its rear end, of larger diameter than said body portion, and having a recess in the periphery thereof; a cone-shaped head also having an annular flange of larger diameter than said body portion, and having screw-threads on its periphery, said body having radial recesses extending substantially from end to end thereof and from the outer face of said body to, and opening into, the bore thereof, and forming inclined seats in said body portion in the rear of said bore, said body portion also having laterally-extending grooves in the sides of the recesses in the rear of said bore; clamping-jaws movable in said recesses, and each of said jaws having a main clamping part and a shank having an inclined lower edge provided with a laterally-extending-reinforcing rib adapted to engage in one of the laterally-extending grooves, and also having a perpendicular recess in the upper edge and adjacent to the juncture of said shank and main part; a divided, non-rotatable, exteriorly screw-threaded member adapted to engage the vertical recesses of the jaws and having recesses in one of its side faces adapted to be engaged by the clamping-jaws; an exteriorly screw-threaded actuating-sleeve in engagement with said screw-threaded ring, and having recesses adjacent to its ends; and a conical shell engaging the cone-shaped head and having interior screw-threads in engagement with the screw-threads of the cone-shaped-head annular flange, and also having an annular recess, whereby the recesses of said rear annular flange and the conical shell form guides for the rotatable actuating-sleeve, substantially as described.

In testimony whereof I hereunto set my name in the presence of two witnesses.

DAVID WEIR.

Witnesses:
RICHARD H. MATHES,
WILLARD EDDY.